No. 712,006. Patented Oct. 28, 1902.
W. E. RICE.
WEIGHING MACHINE.
(Application filed May 27, 1901.)
(No Model.) 3 Sheets—Sheet 1.

Witnesses:
E. Batchelder
P. W. Pezzetti

Inventor:
Walter E. Rice
by Wright Brown & Quimby
Attys.

No. 712,006. Patented Oct. 28, 1902.
W. E. RICE.
WEIGHING MACHINE.
(Application filed May 27, 1901.)

(No Model.) 3 Sheets—Sheet 2.

Witnesses:
E. Batchelder
O. W. Pezzetti

Inventor:
Walter E. Rice
by Wright Brown & Quinby
Attys.

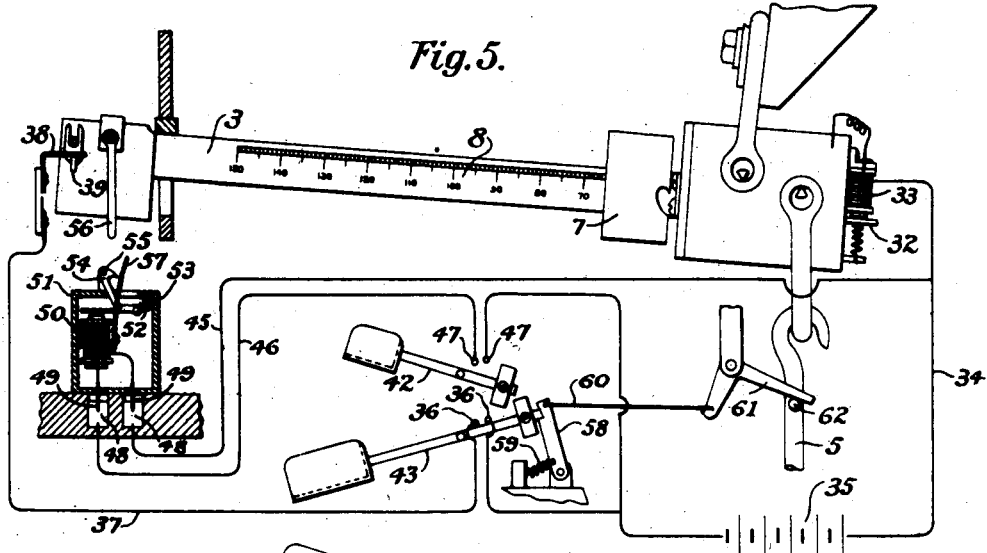

UNITED STATES PATENT OFFICE.

WALTER E. RICE, OF CHELSEA, MASSACHUSETTS.

WEIGHING-MACHINE.

SPECIFICATION forming part of Letters Patent No. 712,006, dated October 28, 1902.

Application filed May 27, 1901. Serial No. 62,020. (No model.)

*To all whom it may concern:*

Be it known that I, WALTER E. RICE, of Chelsea, in the county of Suffolk and State of Massachusetts, have invented certain new and useful Improvements in Weighing-Machines, of which the following is a specification.

This invention relates to weighing-machines employing a beam and a poise moved to a position of balance on the beam by a motor, the balancing of the beam being automatically performed in a novel manner in accordance with my invention.

The invention has among its objects to simplify machines of this character and render their operation accurate and sure, to render them coin-controlled, and to provide means for energizing the motor by the weight of the object to be weighed.

Figures 1, 3, 4:
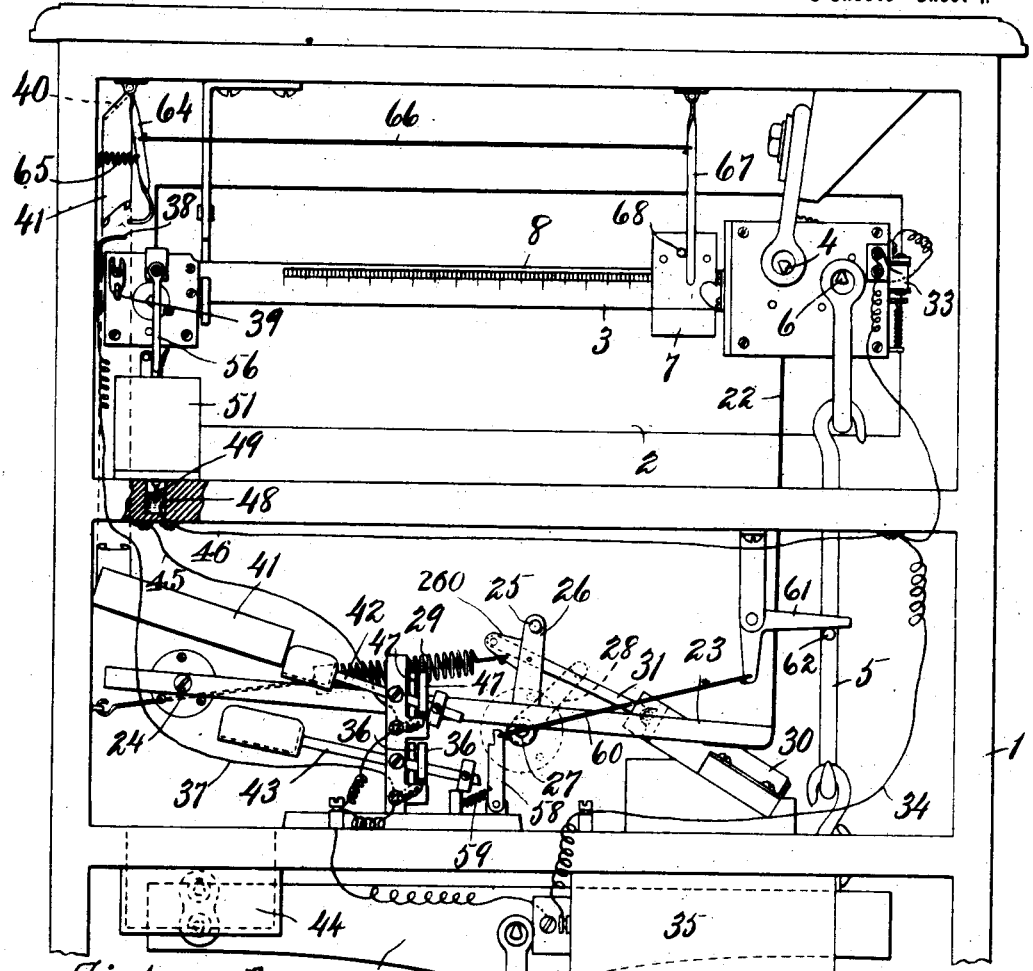
Figure 2:
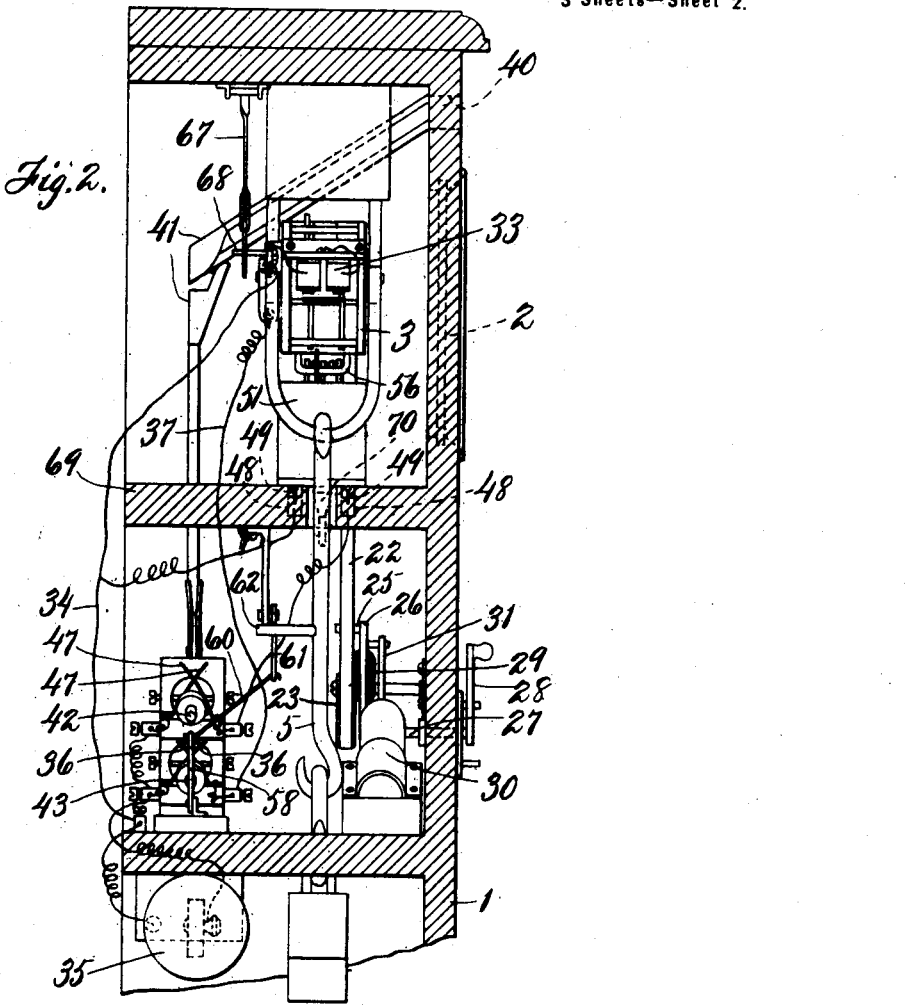

Of the accompanying drawings, Figure 1 represents a rear elevation, partly in section, of an embodiment of my invention in which the clock-motor for moving the poise is wound by hand, the interior of the casing being exposed by the removal of the back. Fig. 2 represents a transverse section through the casing, showing a side elevation of the mechanism. Fig. 3 represents a longitudinal section of the beam, partly broken away. Fig. 4 represents a plan view of the clock-motor. Fig. 5 represents a diagrammatic view of the electrical connections, certain parts therein being transposed in position and represented symbolically. Fig. 6 represents a detail view showing a modified form of circuit-controlling means. Fig. 7 represents a rear elevation showing mechanism for winding the clock-motor by the weight of the object to be weighed. Fig. 8 represents a sectional view of the platform construction in said mechanism.

The same reference characters indicate the same parts in all the figures.

Referring to Figs. 1 to 5, inclusive, 1 indicates a casing inclosing the weighing mechanism and having a glazed opening 2, through which the beam 3 may be observed by a person standing on the weighing-platform, and a removable back cover. (Not shown.) The beam is fulcrumed at 4 and is connected with the platform by the usual devices including a link connection 5, pivoted to the beam at 6.

7 is a sliding poise registering with suitable graduations 8 on the beam and connected to a band 9, which is shown as continued through the poise, but obviously might be in two sections interrupted by the poise. The connection, as shown in Fig. 3, is by means of a screw passing through the poise and into a small block attached to the upper side of the band. The poise moves on rollers 10 10 and is propelled by the band whose ends wind on and are attached to two drums 11 12, journaled by arbors 13 14, respectively, at the outer or free end and the inner or fulcrum end of the beam. The outer drum-arbor 13 is fast to the beam and has attached to it one end of a volute spring 15, whose other end is attached to the drum 11, said spring constituting a power-storing device exerting on the drum a continuous yielding torque tending to move the poise out on the beam. The inner drum 12 is fast on its rotary arbor 14, to which is also secured a ratchet-wheel 16, engaged by a spring-pressed pawl 17, pivoted to the face of a gear-wheel 18, the latter forming part of a train which includes a fly 20. A separate gear-train connects the arbor 14 with a drum 21, on which is wound a band 22. The whole forms a "clock-train," in which the winding-drum is on a separate arbor from the winding-ratchet.

The band 22 passes downward to a connection with a horizontal lever 23, pivoted at 24 to the casing and adapted to be depressed by the engagement of a pin or stud 25 on an arm 26, attached to a shaft 27. On said shaft outside of the casing in a position to be operated by a person standing on the platform is a crank or handle 28, whose downward oscillation causes the pin 25 to engage and depress the lever 23. After such depression and its release the handle 28 will be returned by a spring 29, attached to the arm 26. A dashpot 30, whose piston is connected by a link 31 with a projection 260 on the arm 26, to which projection and the piston the link is pivoted, as indicated in the drawings, causes the oscillation of said arm in either direction to occur gradually. A pivoted detent 32 normally engages the fly 20 and restrains the gear-train 19. Therefore when the lever 23 is depressed, the poise 7 being out on the beam, the arbor 14, carrying with it the drum 12 and ratchet-wheel 16, will rotate with respect to the pawl 17 and the train 19 and will wind up the band 9 on the drum 12 and draw in the poise to its starting-point on the beam, the band at the same time unwinding from the drum 11 and putting the spring 15 under increased tension. A subsequent release of the fly 20 by movement of detent 32 will cause the poise to move out on the beam until the fly is again restrained. This arrangement of independent drums, on which the tape is wound, constructed, and operating in the described manner, avoids all slipping and backlash.

Detent 32 bears the armature of an electromagnet 33, mounted on the beam 3 and whose circuit includes wire 34, battery 35, spring-contacts 36 36, wire 37, fixed spring-contact 38, coacting contact 39 on the beam, and the beam itself. Said circuit, if closed at the contacts 36 36, will be completed through the contacts 38 39 by the rise of the beam, and the magnet 33 will be energized, so as to release the fly 20. Provision is made for completing the circuit of magnet 33 through the agency of a coin, which being deposited in a slot 40 falls through a chute 41, and after oscillating an upper lever 42, whose purpose will be hereinafter explained, falls onto a lower lever 43, and after oscillating the same falls into a coin-receptacle 44. The lever 43 makes a metallic connection between the contacts 36 36.

In parallel with the circuit of magnet 33 is a circuit, including the battery 35, wires 45 46, spring-contacts 47 47, adapted to be connected by the upper coin-lever 42, and two mercury-cups 48 48, in which normally reside the terminals 49 49 of an electromagnet 50, contained in a hollow beam-weight 51, which normally rests on a partition 69 of the casing 1. Said weight also carries a pivoted detent 52, bearing the armature of magnet 50 and normally pressed by a spring 53 into position to engage an arm 54 on a pivoted latch 55, so as to prevent said latch from rotating in a left-handward or anticlockwise direction. The head or lip of said latch is beveled and adapted to be displaced in a contrary direction by a bail or loop 56, carried by the beam 3, so as to automatically engage said bail with the latch when the beam descends. A spring-arm 57 on the weight guides the bail into proper engagement with the latch. Should the circuit of the magnet 50 be completed while there is an upward pull on the bail 56, the catch 55 will be liberated by the detent 52 and release the bail, thereby detaching the weight from the beam and permitting the latter to rise. If the weight 51 is lifted by the beam for any substantial distance, the electrodes or contacts 49 49 will leave the mercury-cups 48 48 and open the circuit of the magnet 50. A guide-pin 70 on the weight occupying a complemental socket in the partition 69 serves to position the weight when the latter descends to rest.

When the lever 43 is oscillated by a coin—the beam being up—it is engaged and held in the position to which it is oscillated by a pivoted latch 58, yieldingly moved toward engaging position by a spring 59 and connected by a cord or wire 60 with a bell-crank lever 61, pivoted to a fixed support and having an arm engaged by a pin 62 on the link connection 5. As said pin 62 rises with the descent of the beam, the latch 58 will be retracted and the lever 43 released and allowed to assume its normal position and break the circuit of the magnet 33 when the beam has descended to a position of balance. The object of this device is to maintain the circuit of magnet 33 in operative condition until the beam balances and then break it, so as to prevent the obtaining of more than one weight for one coin.

An alternate arrangement is shown in Fig. 6, in which a magnet 63, included in the circuit of magnet 33, holds the lever 43 in the position to which it is moved by the coin until said circuit is broken at the contacts 38 39 by the descent of the beam to a position of balance.

64 is a lever normally held by a spring 65 in a position to obstruct the coin-chute 41 and connected by a cord or wire 66 with a lever 67, adapted to be engaged by a pin 68 on the poise when said poise is at the inner end of its travel, so as to retract the lever 64. This arrangement arrests and saves the coin until the poise has been retracted by manipulating the handle 28 from the position which it had assumed at a previous weighing.

The operation of the above-described embodiment of my invention is as follows: Let it be assumed that the beam 3 is graduated from fifty pounds to one hundred and fifty pounds and that a person weighing between these limits steps on the platform to be weighed. If the poise 7 is not already at the inner limit of its travel, the person, following directions displayed on the machine, oscillates the handle 28 so as to retract the poise, releases said handle, and then deposits his coin. The coin first oscillates the lever 42 and closes the circuit of the weight-magnet 50, and as the person's weight is causing the beam to pull upwardly (but with insufficient force to lift the weight 51) the accompanying release of the latch 55 will allow the beam to detach itself from the weight and rise to the limit of its upward travel. The rise of the beam completes the circuit of the magnet 33 through the contacts 38 39, said circuit having already been closed at the contacts 36 36 by the oscillation of the lever 43 through the continued descent of the coin, and magnet 33 oscillates the detent 32 and releases the fly 20, causing the poise 7 to move out on the beam under the pull of the spring 15. Immediately upon the poise reaching a position of balance, causing the beam to descend and break the circuit of magnet 33 at the contacts 38 39, the fly 20 will be restrained, and the travel of the poise stopped, whereupon the beam will swing freely in a position of balance. As the beam balances, the pin 62 oscillates bell-crank lever 61, releasing the coin-lever 43 from latch 58 and opening the circuit of magnet 33 at the contacts 36 36. When the person steps off the platform, the descent of the beam automatically reëngages it with its weight 51. Now let it be assumed that the weight 51 when carried by the beam 33 adds one hundred pounds to the reading of the poise on the beam. If a person weighing more than one hundred and fifty pounds steps on the platform, the poise being retracted to its initial position indicating fifty pounds, the beam will of course rise and carry with it the weight 51, after which, since the circuit of the weight-magnet 50 is then opened by the removal of its contacts 49 49 from the mercury-cups 48 48, the subsequent evolutions of the beam will be performed with the attached weight 51. The beam rises and brings together the contacts 38 39, and upon the deposit of a coin the poise moves out and stops at a position of balance as hereinbefore described, the person's weight being calculated by adding one hundred pounds to the reading of the poise.

The slight disturbance of balance due to the partial shifting of the weight of the band 9 may be compensated for in the calibration of the scale 8 or in any other suitable manner.

Figs. 7 and 8 illustrate an embodiment of my invention wherein the weight of the person or other object to be weighed is utilized to wind the clock-train at the fulcrum end of the beam, manual winding being thereby dispensed with. In place of the handle 28 outside of the casing I attach an arm 71 to the shaft 27 carrying arm 26 and connect this by a wire or cord 72 with the rear end of a lever 73, pivoted at 74 to the weighing-platform 75. Over the platform 75 and hinged thereto at 76 I locate an auxiliary platform 77 to support the person being weighed and connect said auxiliary platform with the outer end of lever 73 by a link 78. The auxiliary platform is normally elevated and the rear end of lever 73 depressed by a spring 79, connecting the outer end of said lever with the main platform, said spring being of sufficient strength to depress the lever 23 and wind up the clock-train in the beam. The main platform 75 has its usual system of levers to transmit movement to a link connection 80, and thence by way of a lever 81 and the link connection 5 to the beam 3. The absence of a person's weight on the platform 77 allows the spring 79 to elevate said platform and wind up the clock-motor. When the person to be weighed steps on the platform 77, he depresses said platform upon the main platform 75, putting the spring 79 under tension for its next winding effort and relieving the lever 23 of the tension of said spring and the weight of the lever 73.

Various modifications may be made in the construction which I have described without departing from the spirit of my invention.

I claim—

1. A weighing-machine comprising a beam and poise, a power-storing device carried by the beam and arranged to shift the poise therealong, actuating means mounted independently of the beam and accessible to the person using the scale, and connections between said means and the power-storing device whereby said means operates to restore power to said device.

2. A weighing-machine comprising a beam and movable beam-balancing means, a power-storing device arranged to move said means into beam-balancing position, and means operable by the weight of the object to be weighed for restoring power to said device.

3. A weighing-machine comprising a beam and a poise shiftable therealong, a power-storing device arranged to shift said poise, and means operable by the weight of the object to be weighed for restoring power to said device.

4. A weighing-machine comprising a beam, a poise movable therealong, means including a power-storing device arranged to automatically bring said poise to a beam-balancing position, and means operable by the weight of the object to be weighed for restoring power to said device.

5. A weighing-machine comprising a beam and movable beam-balancing means, a power-storing device arranged to move said means into beam-balancing position, a platform adapted to support the object being weighed, weighing connections between said platform and the beam, and means actuated by the descent of the platform for restoring power to said device.

6. A weighing-machine comprising a beam and movable beam-balancing means, a power-storing device arranged to move said means into beam-balancing position, a platform adapted to support the object being weighed, weighing connections between said platform and the beam, a second power-storing device actuated by the descent of the platform, and connections therefrom to the first-said device whereby power is restored to the latter upon the ascent of the platform.

7. A weighing-machine comprising a beam, a poise thereon, a detachable weight adapted to increase the weighing value of the poise, provisions whereby the descent of the poise end of the beam automatically attaches the weight thereto, weight-detaching means, and provisions whereby the rise of the beam with weight attached renders said weight-detaching means inoperative.

8. A weighing-machine comprising a beam, a poise thereon, a detachable weight adapted to increase the weighing value of the poise, an electric circuit to detach said weight, and provisions whereby the rise of the beam with weight attached renders said circuit inoperative.

9. A weighing-machine comprising a beam, a poise thereon, a detachable weight adapted to increase the weighing value of the poise, a latch automatically engaging by the descent of the beam for attaching said weight to the beam, a latch-releasing electromagnet, a circuit controlling said magnet, and provisions whereby the rise of the beam with weight attached renders said circuit inoperative.

In testimony whereof I have affixed my signature in presence of two witnesses.

WALTER E. RICE.

Witnesses:
R. M. PIERSON,
C. F. BROWN.